United States Patent
Bondugula et al.

(10) Patent No.: US 10,671,812 B2
(45) Date of Patent: Jun. 2, 2020

(54) TEXT CLASSIFICATION USING AUTOMATICALLY GENERATED SEED DATA

(71) Applicant: EQUIFAX INC., Atlanta, GA (US)

(72) Inventors: Rajkumar Bondugula, Marietta, GA (US); Allan Joshua, Atlanta, GA (US); Hongchao Li, Alpharetta, GA (US); Hannah Wang, Suwanee, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

(21) Appl. No.: 16/333,359

(22) PCT Filed: Mar. 22, 2018

(86) PCT No.: PCT/US2018/023686
§ 371 (c)(1),
(2) Date: Mar. 14, 2019

(87) PCT Pub. No.: WO2019/182593
PCT Pub. Date: Sep. 26, 2019

(65) Prior Publication Data
US 2020/0034419 A1    Jan. 30, 2020

(51) Int. Cl.
*G06F 40/295* (2020.01)
*G06N 5/04* (2006.01)
(Continued)

(52) U.S. Cl.
CPC .......... *G06F 40/295* (2020.01); *G06F 16/353* (2019.01); *G06N 5/04* (2013.01); *G06N 20/00* (2019.01)

(58) Field of Classification Search
None
See application file for complete search history.

(56) References Cited

U.S. PATENT DOCUMENTS 7,003,442 B1 * 2/2006 Tsuda .................. G06F 16/93
704/9
7,191,117 B2 * 3/2007 Kirby .................. G06F 40/20
704/9
(Continued)

FOREIGN PATENT DOCUMENTS

| CN | 107169086 | 9/2017 |
| WO | 2016180270 | 11/2016 |
| WO | 2017090051 | 6/2017 |

OTHER PUBLICATIONS

"Long-Term Storage for Google Code Project Hosting", Google Code Archive, word2vec, Available online at: https://code.google.com/archive/p/word2vec/, Accessed from Internet at Mar. 13, 2019, 7 pages.

(Continued)

*Primary Examiner* — Thuykhanh Le
(74) *Attorney, Agent, or Firm* — Kilpatrick Townsend & Stockton LLP (57) ABSTRACT

Certain aspects produce a scoring model that can automatically classify future text samples. In some examples, a processing device perform operations for producing a scoring model using active learning. The operations includes receiving existing text samples and searching a stored, pre-trained corpus defining embedding vectors for selected words, phrases, or documents to produce nearest neighbor vectors for each embedding vector. Nearest neighbor selections are identified based on distance between each nearest neighbor vector and the embedding vector for each selection to produce a text cloud. Text samples are selected from the text cloud to produce seed data that is used to train a text classifier. A scoring model can be produced based on the text classifier. The scoring model can receive a plurality of new text samples and provide a score indicative of a likelihood of being a member of a selected class.

20 Claims, 7 Drawing Sheets

(51) Int. Cl.
*G06N 20/00* (2019.01)
*G06F 16/35* (2019.01)

(56) References Cited

U.S. PATENT DOCUMENTS

| | | | | |
|---|---|---|---|---|
| 7,295,965 | B2* | 11/2007 | Haigh | G10L 15/10 |
| | | | | 704/9 |
| 7,533,399 | B2* | 5/2009 | Ma | H04N 21/41407 |
| | | | | 725/46 |
| 7,620,539 | B2* | 11/2009 | Gaussier | G06F 40/45 |
| | | | | 704/2 |
| 8,548,951 | B2* | 10/2013 | Solmer | G06F 16/93 |
| | | | | 707/661 |
| 8,645,123 | B2* | 2/2014 | Hua | G06K 9/723 |
| | | | | 704/1 |
| 8,818,788 | B1* | 8/2014 | Mihalik | G06F 40/30 |
| | | | | 704/1 |
| 2007/0271504 | A1* | 11/2007 | Horvitz | G06Q 10/107 |
| | | | | 715/236 |
| 2011/0035211 | A1* | 2/2011 | Eden | G06F 40/289 |
| | | | | 704/10 |
| 2011/0044447 | A1* | 2/2011 | Morris | G06T 11/206 |
| | | | | 379/265.03 |
| 2011/0184729 | A1* | 7/2011 | Nam | G06F 16/951 |
| | | | | 704/9 |
| 2011/0320189 | A1* | 12/2011 | Carus | G06F 40/20 |
| | | | | 704/9 |
| 2012/0150531 | A1* | 6/2012 | Bangalore | G06F 40/40 |
| | | | | 704/9 |
| 2012/0232902 | A1* | 9/2012 | Bocchieri | G10L 15/063 |
| | | | | 704/243 |
| 2012/0271627 | A1* | 10/2012 | Danielyan | G06F 40/284 |
| | | | | 704/9 |
| 2013/0024183 | A1* | 1/2013 | Cardie | G06F 40/20 |
| | | | | 704/8 |
| 2013/0041652 | A1* | 2/2013 | Zuev | G06F 40/30 |
| | | | | 704/8 |
| 2013/0110498 | A1* | 5/2013 | Bekkerman | G06Q 10/1053 |
| | | | | 704/9 |
| 2013/0132071 | A1* | 5/2013 | Peterson | G06F 40/284 |
| | | | | 704/9 |
| 2013/0173254 | A1* | 7/2013 | Alemi | G06F 40/40 |
| | | | | 704/9 |
| 2013/0268262 | A1* | 10/2013 | Moilanen | G06F 40/40 |
| | | | | 704/9 |
| 2014/0007257 | A1* | 1/2014 | Dougherty | G09B 5/062 |
| | | | | 726/28 |
| 2014/0372347 | A1* | 12/2014 | Cohen | G06F 11/0709 |
| | | | | 706/12 |
| 2015/0356057 | A1* | 12/2015 | Subramanian | G06F 40/117 |
| | | | | 704/9 |
| 2015/0363709 | A1* | 12/2015 | Kamei | G06K 9/6269 |
| | | | | 706/12 |
| 2015/0370781 | A1* | 12/2015 | Galle | G06F 40/211 |
| | | | | 704/9 |
| 2016/0034757 | A1* | 2/2016 | Chhichhia | G06K 9/00469 |
| | | | | 382/206 |
| 2016/0118060 | A1* | 4/2016 | Yadav | G06F 3/04842 |
| | | | | 704/257 |
| 2016/0132484 | A1* | 5/2016 | Nauze | G06F 40/242 |
| | | | | 704/9 |
| 2016/0196237 | A1* | 7/2016 | Cardonha | G06F 16/345 |
| | | | | 704/9 |
| 2018/0101791 | A1* | 4/2018 | Viswanathan | G06N 20/00 |
| 2018/0239741 | A1* | 8/2018 | Agarwal | G06F 16/313 |
| 2018/0300580 | A1* | 10/2018 | Bradford | G06K 9/40 |
| 2019/0065991 | A1* | 2/2019 | Guggilla | G06F 16/3329 |
| 2019/0138652 | A1* | 5/2019 | Miranda | G06F 16/353 |
| 2019/0265852 | A1* | 8/2019 | Bax | G06F 16/287 |
| 2019/0273789 | A1* | 9/2019 | Modarresi | G06N 20/00 |

OTHER PUBLICATIONS

"Meeting the Demands of Digitally-Savvy Consumers", Equifax Inc., Available online at: https://assets.equifax.com/assets/usis/powerleadCheckAndRealResults.pdf, Accessed from Internet at Mar. 13, 2019, 1 page.

PCT/US2018/023686, "International Search Report and Written Opinion", dated Dec. 18, 2018, 11 pages.

Pennington et al., "Global Vectors for Word Representation", GloVe, Available online at: https://nlp.stanford.edu/projects/glove/, Accessed from Internet at Mar. 13, 2019, 3 pages.

* cited by examiner

BMW

(BMW, 1.0000000000000002)
(Audi, 0.8255090348321.1854)
(Porsche, 0.7640794519619569)
(Bmw, 0.7270929623675291)
(Mercedes-Benz, 0.7195158805022)
(Lexus, 0.7138077434326905)
(Volkswagen, 0.7076383328837639)
(Mercedes, 0.6947246793205432)
(Z4, 0.6931608463189852)
(Volvo, 0.6859595280152656)
(Nissan, 0.6774121243454375)
(Mazda, 0.676269832177649)
(Acura, 0.6740850790977491)
(VW, 0.6707988288388766)
(Honda, 0.6705487712345793)
(Toyota, 0.6679803860241063)
(Subaru, 0.6577251245653917)
(Infiniti, 0.6498277854354294)
(M3, 0.6407962664767579)
(Hyundai, 0.6370687587721863)
(328i, 0.6296500509266145)
(bmw, 0.6280394689064444)
(Benz, 0.621393040375879)
(E46, 0.620214827643014)
(Ferrari, 0.610706215406964)
(AMG, 0.609037945883726​4)
(325i, 0.6077404273085812)
(Coupe, 0.6038330255711619)
(Chevrolet, 0.6027284608058223)
(AUDI, 0.6011670940041827)

| MARRIAGE | (marriage, 0.9999999999999998)<br>(marriages, 0.7922228219235895)<br>(divorce, 0.7509674757697185)<br>(same-sex, 0.7128368100220316)<br>(marry, 0.6998281316857915)<br>(marital, 0.6971063880652861)<br>(Marriage, 0.6948849135683641)<br>(married, 0.6867363348897648)<br>(marrying, 0.6780126918640281)<br>(divorced, 0.6660813503064568)<br>(marriage, 0.6615521159117139)<br>(couples, 0.6465331025936899)<br>(unmarried, 0.6234593069452801)<br>(relationship, 0.6067215631969943)<br>(spouse, 0.6030703490510606)<br>(wife, 0.5952820954588657)<br>(birth, 0.5931329369783515)<br>(husband, 0.587658753702246)<br>(friendship, 0.5695144055839065)<br>(infidelity, 0.5665755947854688)<br>(mother, 0.5654395381975227)<br>(wedlock, 0.5633595045029123)<br>(matrimony, 0.5620184909954602)<br>(bride, 0.5596428987010718)<br>(relationships, 0.5554314415823618)<br>(vows, 0.5499148124629047)<br>(husbands, 0.5497647978741667)<br>(heterosexual, 0.5460472684963574)<br>(remarried, 0.5450241729187972)<br>(father, 0.5439937139430228)<br>(homosexual, 0.543496751637863)<br>(divorces, 0.5434174113929997)<br>(equality, 0.542413115206647)<br>(spouses, 0.542171916294867)<br>(daughters, 0.5388219022695946)<br>(daughter, 0.5385999341114972)<br>(parents, 0.5361680304852047) |

TEXT CLASSIFICATION USING AUTOMATICALLY GENERATED SEED DATA

TECHNICAL FIELD

This disclosure generally relates to methods for improving the efficiency of text classification using automatically generated seed data for training a text classifier.

BACKGROUND

Active learning is a semi-supervised method used to train models when the number of classified examples are orders of magnitude smaller than the number of examples to be classified in the future. For active learning to begin, a small set of classified samples, referred to as seed data, is needed to begin the iterative process of active learning. The size of the initial classified data set necessary is dependent on the nature of the classification model being developed and the dimensionality of the data.

For example, if a model is being developed for text classification, then the dimensionality of each data point is very high, corresponding to the number of unique words in the entire data set. For such a classifier, the seed data should include at least a few hundred classified examples. The bigger the seed data set, the better each round of active learning will be. For text classification, initial (also called seed data) data points (text samples) are classified manually to begin active learning. A rough classifier is built from the small number of examples in the seed data and this rough classifier is used to label unlabeled data. The most confident labels are manually verified and then added to the seed data. This new seed data that contains the original seed labeled data and newly added labeled data is used to train a higher quality (as more data was used to train the classifier) classifier. This process can be iterated for multiple rounds. This process is laborious, and the number of samples used for training is limited by the amount of time that can be spent manually classifying samples. Thus, the accuracy of models produced in this way can be limited.

SUMMARY

Certain aspects and examples are disclosed for using automatically generated seed data to train a classifier, which can then be used to produce a scoring model to automatically classify future text samples. In some examples, a processing device executes computer program instructions to cause the processing device to perform operations for producing a scoring model using active learning. The operations can include receiving existing text samples corresponding to a selected class and searching a stored, pre-trained corpus defining embedding vectors for selections from the text samples to produce nearest neighbor vectors for each embedding vector. A selection from the text samples can be an individual word, a phrase, a block of text, or a document. The nearest neighbor selections corresponding to the nearest neighbor vectors are searched based on distance between each nearest neighbor vector and the embedding vector for each selection to produce a text cloud. Text samples based on the text cloud are used to produce seed data that is used to train a text classifier. A scoring model can be produced using the text classifier. The scoring model can receive a large number of new text samples and provide a score indicative of a likelihood of a text sample being a member of a selected class. The score can be produced for each of the large number of new text samples.

BRIEF DESCRIPTION OF THE FIGURES

These and other features, aspects, and advantages of the present disclosure are better understood when the following Detailed Description is read with reference to the accompanying drawings.

DETAILED DESCRIPTION

Certain aspects of this disclosure involve facilitating a training of a classifier by generating a sufficiently large set of keys to use as seed data for the training. This set of keys is generated by finding many nearest-neighbor vectors in a large, pre-trained corpus. The nearest neighbor vectors are those vectors that are relatively close (e.g., in a Euclidean space) to vectors for a smaller set of input selections from existing text samples. Each nearest neighbor vector represents a text selection to be included in the set of keys. A "selection" can be a word, phrase, paragraph, or document, and a key can correspondingly be a keyword, key-phrase, key-paragraph, or key-document. The systems and methods described herein can provide a way to identify entities that are going through specific events based on their natural language expression, such as might be present in Emails or public forums, for example, in social media. These entities can be people or organizations.

In some aspects, automatically generating seed data having a very large set of keys and using this seed data to automatically train a text classifier can create a more accurate, trained text classifier than the text classifiers that are provided with existing solutions. A text classifier trained with the automatically generated seed data and a scoring model using such a trained text classifier can be produced much more rapidly than is possible with existing solutions. For example, certain aspects described herein can reduce or eliminate the manual effort required by existing solutions when generating seed data to train the text classifier, meaning a more accurate classifier can be produced in a given amount of time.

Certain aspects of this disclosure describe operations for producing a scoring model using a trained classifier. In some aspects, a processing device can receive existing text samples corresponding to a selected class. The processing device can search a stored, pre-trained corpus defining embedding vectors for selections from the text samples to produce nearest neighbor vectors for each embedding vector. The nearest neighbor text selections are identified. The nearest neighbor text selections can be identified by systematically checking distance and retaining or selecting those that are closest. Alternatively, text selections corresponding to at least some of the nearest neighbor vectors can be ordered based on a distance between each nearest neighbor vector and the embedding vector for each selection to produce a text cloud. Text samples can be selected based on the text cloud to produce seed data that is used to train a text classifier. A scoring model can be produced using the text classifier. The scoring model can receive new text samples and provide a score indicative of a likelihood of being a member of a selected class. The score can be produced for each of the new text samples. A scoring model can be produced for any desired class. The scoring model can be pre-trained with a large sample base quickly and efficiently, resulting in higher accuracy of text classification given a specified amount of time to produce the classifier. The process can be repeated for many classes and many models can be produced. In some aspects, a processing device is used to preliminarily filter the existing text samples to remove text samples associated with entities that hold no interest for the operator of the system.

In some aspects, the ordering of nearest neighbor text selections can include calculating the distance to each nearest neighbor vector using multiple distance metrics. The ordering of nearest neighbor selections can also include receiving operator input as to which of the metrics to use in generating the scoring model. The distance metrics can include, as example, Euclidian distance, cosine distance, or both. In some aspects, operator input can also include a cutoff distance for nearest neighbor vectors. The cutoff distance can cause certain selections to be excluded from the text cloud. In one example, words for which the nearest neighbor vector is further from the selected vector than the cutoff distance are excluded from the text cloud.

Once a scoring model has been produced, a processing device can be used to score each new text sample from a group of new text samples using the scoring model. A new text sample can be identified as a response text sample if a score for the new text sample exceeds a selected threshold. A response text sample is one that requires a response in order to carry out some objective. For example, a social profile for a user identifier (ID) associated with the new text sample can be generated so that the user ID can be matched to an identified individual. A response can then be directed to the individual. For example, if the text sample is a message originating from the individual through a social networking platform such as Twitter or Facebook, a response can be automatically formulated and sent back through the social networking platform or through a different channel.

In some aspects, the processing device is part of a system that also includes a non-transitory computer-readable medium for storing a text cloud, a contact list, text samples, and the scoring model. The processing device is configured to perform at least some of the operations described above. In some aspects, a non-transitory computer-readable medium includes computer program code instructions that are executable by a processing device to perform at least some of the operations described above.

The features discussed herein are not limited to any particular hardware architecture or configuration. A server system, computing device, or computing environment can include any suitable arrangement of components that provide a result conditioned on one or more inputs. Suitable computing systems include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

An objective of the techniques described herein is to identify text samples, which can be phrases, paragraphs, or documents, that represent an intent of interest. This objective could be met in various ways. For example, a phrase could be used directly. However, searching for a phrase such as, "I am looking to buy a car" may find almost zero text samples corresponding to his intent unless entities express the intent in exactly this way. To increase the possibility of finding more text samples corresponding to the intent, less specific phrases ("buy car") can be used, or in an extreme a keyword ("car") can be used. In such an extreme case, many false positives will result. For this reason, when this approach is used, the data set is filtered using Boolean combinations of multiple keywords.

Another possibility is to convert the text sample into vector space format, sometime referred to as "VSM," and then use metrics such as cosine to find related text samples. The drawback of this approach is that the dimensionality of each text sample is equal to number of unique terms in the entire data set (in an extreme case, equal to the number of words in the relevant language, words from other languages used regularly, and all proper nouns). If each text sample is very short (such as tweet), this approach will also return very few results, but certainly more results than using the complete phrase and higher quality results than using keywords alone.

The systems and methods described below use vector representation of the word, phrase, paragraph or document. This vector (as opposed to presence, absence, frequency counts, or some transformation of frequency counts as with VSM) represents the context in which the word, phrase, paragraph, or document was used and this context is compared with other contexts to find words, phrases, paragraphs, or documents used in similar contexts. Therefore, words can be used as seeds to identify other words (also called neighbors) that are used in a similar context or other documents (such as social media texts or on-line articles) that are about or related to the seed word. In addition to using text selections to identify neighboring words (using their contexts in the form of word vector) and then using these words to find neighboring documents, vectors representing text selections can be used to identify the related documents as well.

Figure 1:
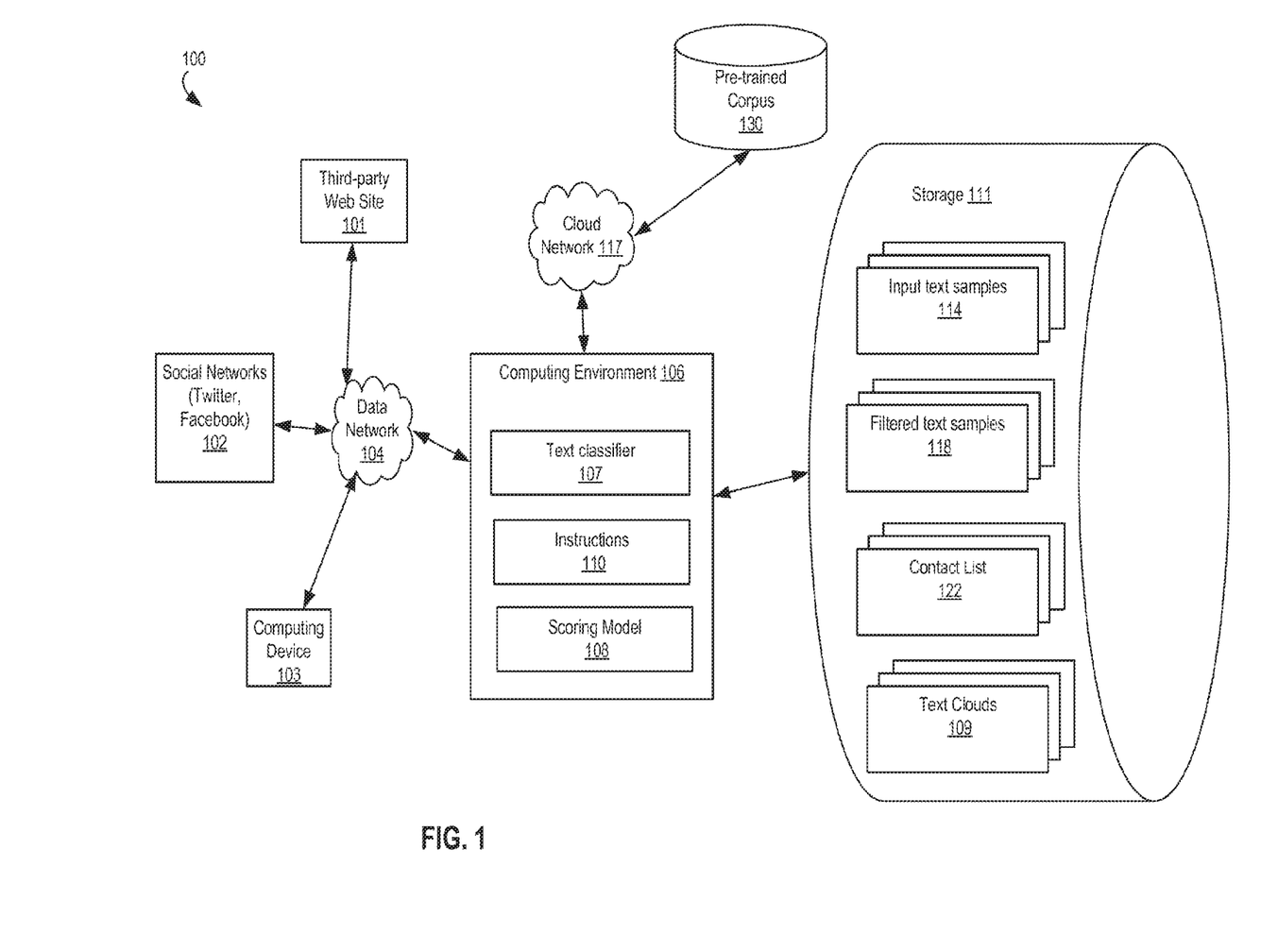
FIG. 1 depicts an example of a computing system that can perform text classification using automatically generated seed data according to some aspects of the present disclosure.

Referring now to the drawings, FIG. 1 depicts an example of a computing system 100 that can provide text classification using automatically generated seed data. FIG. 1 depicts examples of hardware components of a computing system 100 according to some aspects. The computing system 100 is a specialized computing system that may be used for processing large amounts of data using a large number of computer processing cycles. The computing system 100 may include a computing environment 106. The computing environment 106 may be a specialized computer or other machine that processes the data received within the computing system 100. The computing environment 106 may include one or more other systems. For example, the computing environment 106 may include a database system for accessing network-attached data stores, a communications grid, or both. A communications grid may be a grid-based computing system for processing large amounts of data. The computing system 100 may also include one or more network-attached data stores 111 for storing files produced and used during text classification using automatically generated seed data. These files can include, as examples, input text samples 114, filtered text samples 118, and a contact list 122 of persons who have been identified for responses to text samples. Input text samples 114 can be existing text samples obtained from a database or by accumulation over time. In some aspects, the network-attached data stores 111 can also store any intermediate or final data generated by one or more components of the computing system 100. For example, a text cloud 109, discussed further below, can also be stored in the network-attached data stores.

Computing environment 106 in the example of FIG. 1 is also connected to third-party Web sites 101 and to social networks 102 such as Twitter® or Facebook®. The GUI for input from and output to an operator of the system can be presented on one or more computing devices, such as computing device 103. Computing devices 103 can also be associated with users that generate texts via social networking platforms, or by Email. As used herein, the term "user" generally refers to an entity such as a person or business that generates text samples and receives automated responses, whereas the term "operator" refers to a researcher or technologist who is guiding or using the text classification process. All of these entities are connected to computing environment 106 via a data network 104. In some aspects, data network 104 can include the Internet. Network-attached data stores used in the computing system 100 may also store a variety of different types of data organized in a variety of different ways and from a variety of different sources. For example, network-attached data stores may include storage other than primary storage located within computing environment 106 that is directly accessible by processors located therein. Network-attached data stores may include secondary, tertiary, or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

Still referring to FIG. 1, the computing environment 106 can include one or more processing devices that execute program code. The program code, which is stored on a non-transitory computer-readable medium, can include the text classifier 107. The program code can also include scoring model 108. The scoring model 108 can calculate relevance scores for text samples, wherein a cutoff score is used to determine text samples meriting an automated response, which may be made through data network 104. The program code also includes instructions 110 to train the text classifier 107 to produce the scoring model as described below with respect to FIG. 2. Text cloud 109 is temporarily stored during this process. The computing system 100 may also include one or more cloud networks 117. A cloud network 117 may include a cloud infrastructure system that provides cloud services. In certain examples, services provided by the cloud network 117 may include a host of services that are made available to operators of the cloud infrastructure system on demand. A cloud network 117 is shown in FIG. 1 as being connected to computing environment 106 (and therefore having computing environment 106 as its client), but cloud network 117 may be connected to or utilized by any of the devices in FIG. 1. Services provided by the cloud network 117 can dynamically scale to meet the needs of its clients. The cloud network 117 may include one or more computers, servers, or systems. In some aspects, one or more operator's computing devices can also be connected via the cloud network and can access the computing environment 106 and the network-attached data stores included in the computing system 100. In the example of FIG. 1, cloud network 117 houses or connects to pre-trained corpus 130, which is used to generate seed data as will be discussed in further detail below. Pre-trained corpus 130 can be updated via the Internet at regular intervals.

The numbers of devices depicted in FIG. 1 are provided for illustrative purposes. Different numbers of devices may be used. For example, while each device, server, and system in FIG. 1 is shown as a single device, multiple devices may instead be used. Each communication within the computing system 100 may occur over one or more data networks 104. Data networks 104 may include one or more of a variety of different types of networks, including a wireless network, a wired network, or a combination of a wired and wireless network. Examples of suitable networks include the Internet, a personal area network, a local area network ("LAN"), a wide area network ("WAN"), a wireless local area network ("WLAN"), or a UNIX/Linux/Hadoop HDFS file system framework. A wireless network may include a wireless interface or combination of wireless interfaces. A wired network may include a wired interface. The wired or wireless networks may be implemented using routers, access points, bridges, gateways, or the like, to connect devices in the data network 104. The data networks 104 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

Figure 2:
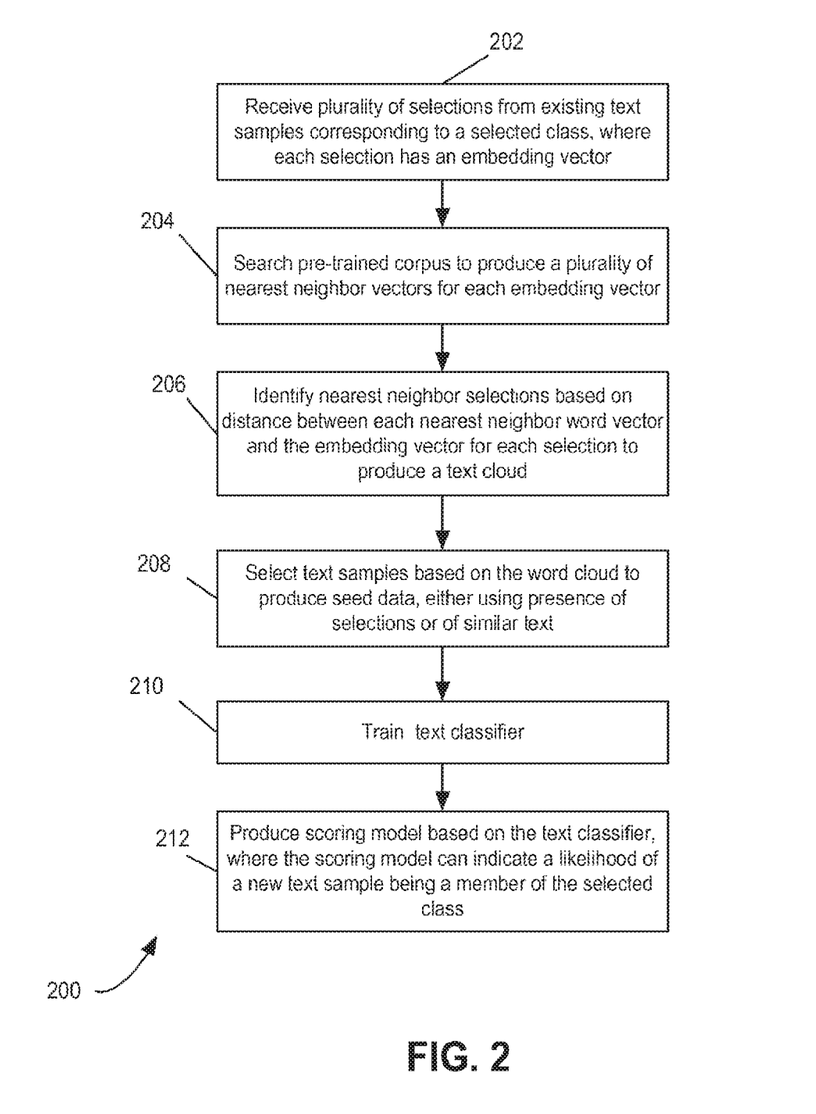
FIG. 2 depicts an example of a method for training a text classifier and producing a scoring model according to some aspects of the present disclosure.

FIG. 2 is a flowchart of a method 200 for automatically training a text classifier based on automatic generation of seed data using text samples. Method 200 begins at block 202, where keys from existing text samples are received, for example, through a standard operator input device connected to computing environment 106. Each key has an embedding vector. At block 204, a pre-trained corpus 130 is searched to produce a plurality of nearest neighbor vectors for each embedding vector. At block 206, nearest neighbor selections corresponding to at least some nearest neighbor vectors are identified based on distance between each nearest neighbor vector and the embedding vector for each selection in order to produce a text cloud. At block 208, text samples are selected based on selections from the samples occurring in the text cloud and these text samples can be used to automatically produce seed data, either directly, or by using text that is similar to that of the text samples from the text cloud. The seed data includes a large number of text samples that can be used for training a classifier. At block 210, the text classifier 107 is trained. The text classifier can be trained using the embeddings from the seed data themselves or using other representations of the text sample or text samples such as text, vector space models, and or with other features (examples: numerical/categorical features, part-of-speech tags, sentiments etc.). At block 212, a scoring model 108 is generated. The scoring model 108 can receive a new text sample and provide a score indicative of a likelihood of the new text sample being a member of the selected class.

Figure 3:
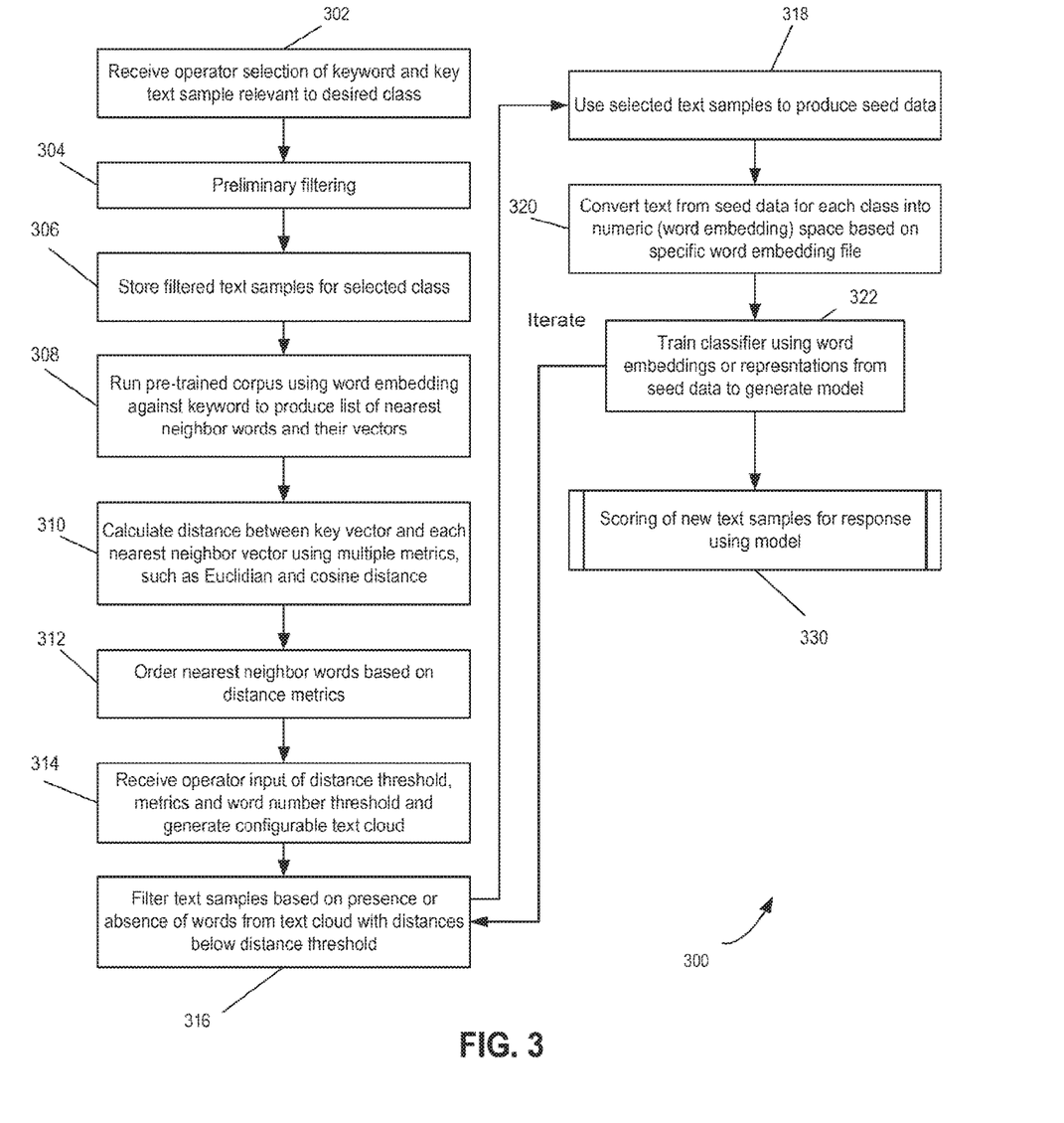
FIG. 3 depicts an example of a method for training a text classifier and producing a scoring model according to some aspects of the present disclosure.

The examples shown in FIGS. 3-6 are based on embeddings and selections being word-based and on keys being keywords. As previously discussed, the techniques and systems described herein can work with various types of text samples, including phrases, paragraphs, and documents. FIG. 3 is a flowchart of a method 300 for programmatically training a text classifier based on automatic generation of seed data using text samples associated with a very large number of users. Method 300 begins at block 302, where an operator input of a keyword with its corresponding key text sample from stored key text samples 114 is received, for example, through a standard operator input device connected to computing environment 106. At block 304, preliminary filtering is performed to obtain filtered text samples from a large number of existing text samples received by system 100. As an example, text samples may be filtered by programmatically examining the text samples for trademarks or business user IDs to filter out those which are attributable to commercial enterprises. Certain forms of words can be used for this type of filtering as well. For example, if the selected class of text samples pertains to individuals contemplating marriage, terms like "bridal" and "florist" may cause a sample to be filtered out. Filtering can also be applied to remove text samples that use relevant words but indicate negativity, such as, "I will never get married." Filtering can be applied in order to remove text samples associated with entities that hold no interest for the operator of the system in terms of a scoring model and determining which new text samples merit a response. Such entities can be referred to herein as "excluded entities."

Continuing with FIG. 3, at block 306, the filtered text samples 118 for a desired text classification (class) are stored in network-attached data stores 111. At block 308, a pre-trained corpus 130 using word embedding is run against the keyword to produce a list of nearest neighbor words and their vectors in a specified number of dimensions. The embedding vector for the keyword also comes from the pre-trained corpus. In this example, 300 dimension vectors are used. "Running" a pre-trained corpus includes searching the pre-trained corpus for selected words and making use of defined embedding vectors in the corpus for selected words.

Word embedding provides modeling and feature learning for natural language processing. Word embedding enables the identification of neighbors in a word space so that large and diverse data points can be located. A publically available, pre-trained corpus can be used. Examples of a pre-trained corpus include Word2Vec, available from Google LLC and GloVe available from Stanford University. In the example presented here, the chosen corpus is copied to system 100 as pre-trained corpus 130. For example, if an operator uses word embedding to find text samples that fall into the class indicating that the user corresponding to the text samples is planning to purchase a car, a vector for the word "car" might produce words such as, "automobile," "ride," or "repair" from the embedding space vectors.

Still referring to FIG. 3, at block 310, distances between the key vector in each nearest neighbor vector are calculated using multiple distance metrics. For example, the distance may be calculated both as Euclidean distance and a cosine distance. At block 312, the nearest neighbor words determined from the word embedding distance calculation are ordered for each distance metric based on the calculated distance. In order of the words, the nearest neighbor words corresponding to the plurality of nearest neighbor vectors are identified based on distance between each nearest neighbor vector and the embedding vector for each selected word and placed in increasing or decreasing order. At block 314, the computing environment 106 can receive operator input indicating a distance threshold, the selected distance metric to be used, and an occurrence number threshold to be used in obtaining selected text samples. The values for the distance threshold, the selected distance metric to be used, and the occurrence number threshold can be stored for further use by the method 300. The occurrence number threshold defines a minimum number of words that must occur in a text sample for it to be used. Computing environment 106 can receive these operator inputs through a standard computing device, such as computing device 103, or through a local input/output device associated with computing environment 106. With this operator input, the ordered list of nearest neighbor words outputted from block 308 and 314, and the distances outputted from block 310, computing environment 106 generates text cloud 109. The distance threshold is used as a cutoff distance wherein the text cloud includes no nearest neighbor words for which a distance between a corresponding nearest neighbor vector and a selected word is greater than the cutoff distance.

Figure 4:
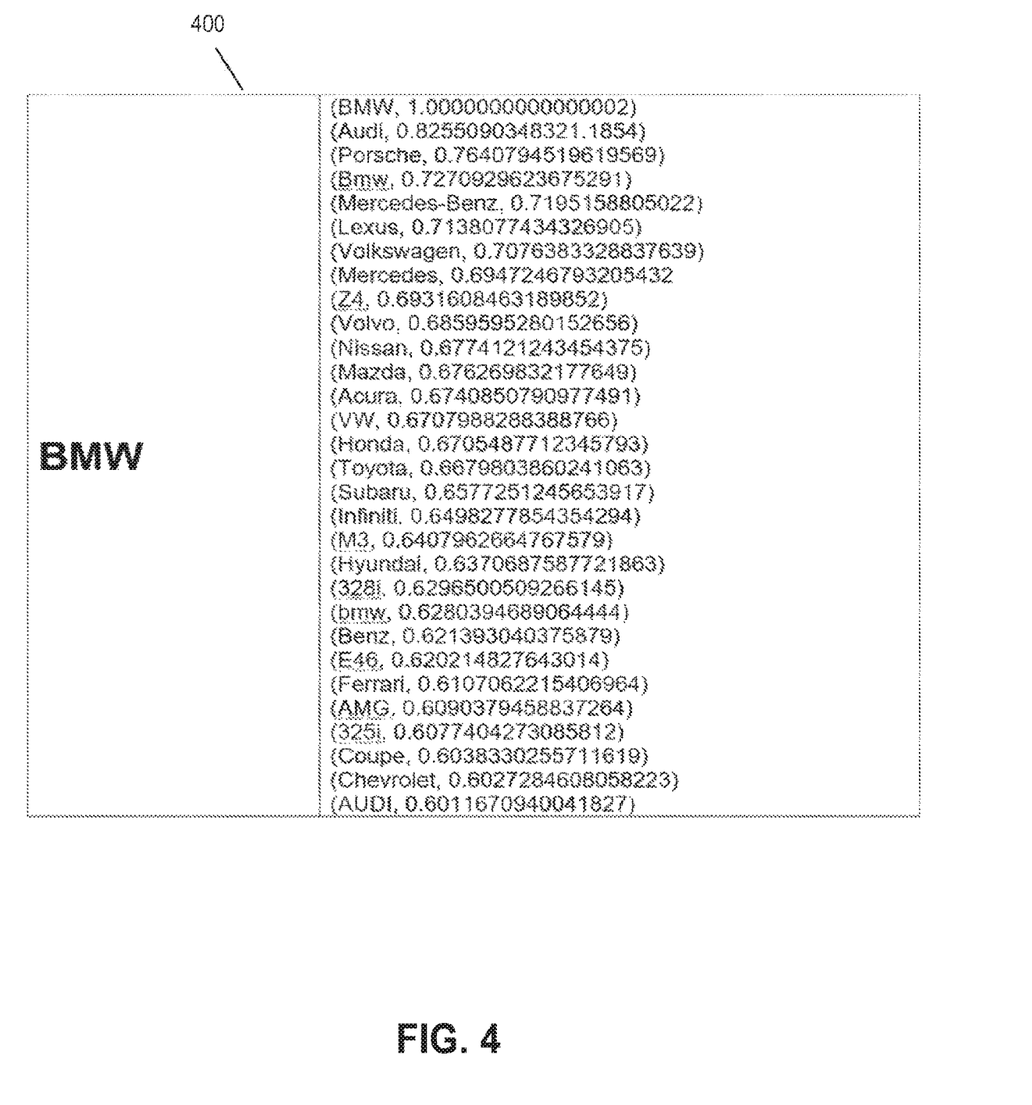
FIG. 4 depicts an example of a text cloud that can be produced in the process of training a text classifier as shown in FIG. 2 or 3 according to some aspects of the present disclosure.
Figure 5:
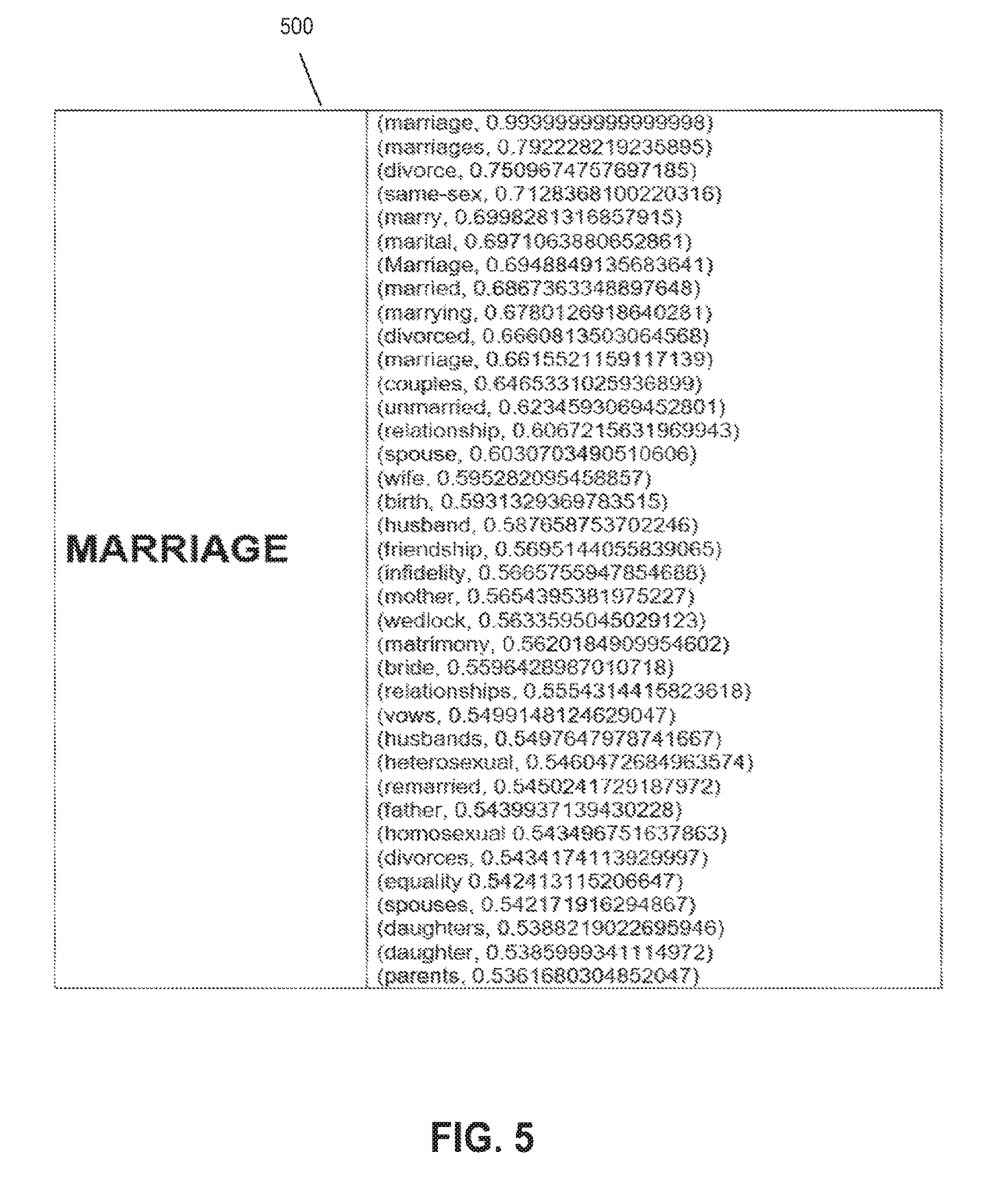
FIG. 5 depicts another example of a text cloud that can be produced in the process of training a text classifier as shown in FIG. 2 or 3 according to some aspects of the present disclosure.

An illustrative portion of an example text cloud is shown in FIG. 4. This text cloud 400 is for the keyword "BMW" as representative of the vehicle brand BMW®, and may be used in part to categorize text samples for a classification ("class") of text samples that are indicative of a desire to purchase a car on the part of users. An illustrative portion of another example text cloud is shown in FIG. 5. This text cloud 500 is for the keyword "marriage" and may be used in part to categorize text samples for a classification ("class") of text samples that are indicative of a desire to get married on the part of users.

Continuing with FIG. 3, at block 316, text samples are filtered out based on the presence or absence of words from the text cloud with distances below a distance threshold to produce selected text samples. A reusable software component can optionally be used for this filtering. In the example of FIG. 3, this filtering selects text samples based on the presence of words from the text samples in the text cloud. However, selection based on the text cloud can also be accomplished by determining the presence of text similar to seed data text within the text cloud.

At block 318, the selected text samples are used to automatically produce seed data. The seed data includes a large number of text samples that can be used for training a classifier. At block 320 of FIG. 3, text samples from the seed data for a class are converted into embedding in a numeric (word embedding) space. At block 322, the text classifier 107 is trained, for example using the embeddings from the seed data to generate a scoring model 108. The text classifier can alternatively be trained using representations of the original text samples. This process is iterative as indicated in FIG. 3, and blocks 316, 318, 320, and 322 are repeated until the model can be generated and stored. At block 330, the stored scoring model 108 can be used to score and classify new text samples. The scoring model 108 is operable to receive a new text sample and provide a score indicative of a likelihood of the new text sample being a member of the selected class for each of the plurality of new text samples. In every iteration, the performance (in terms of at least some of precision, recall, f-measure and accuracy) of the text classifier is measured using at least one of cross-validation and hold-out data. The iterations are continued until the performance of the classifier in subsequent iterations is no longer improving, i.e., until adding more training data no longer results in improved performance of the classifier.

Figure 6:
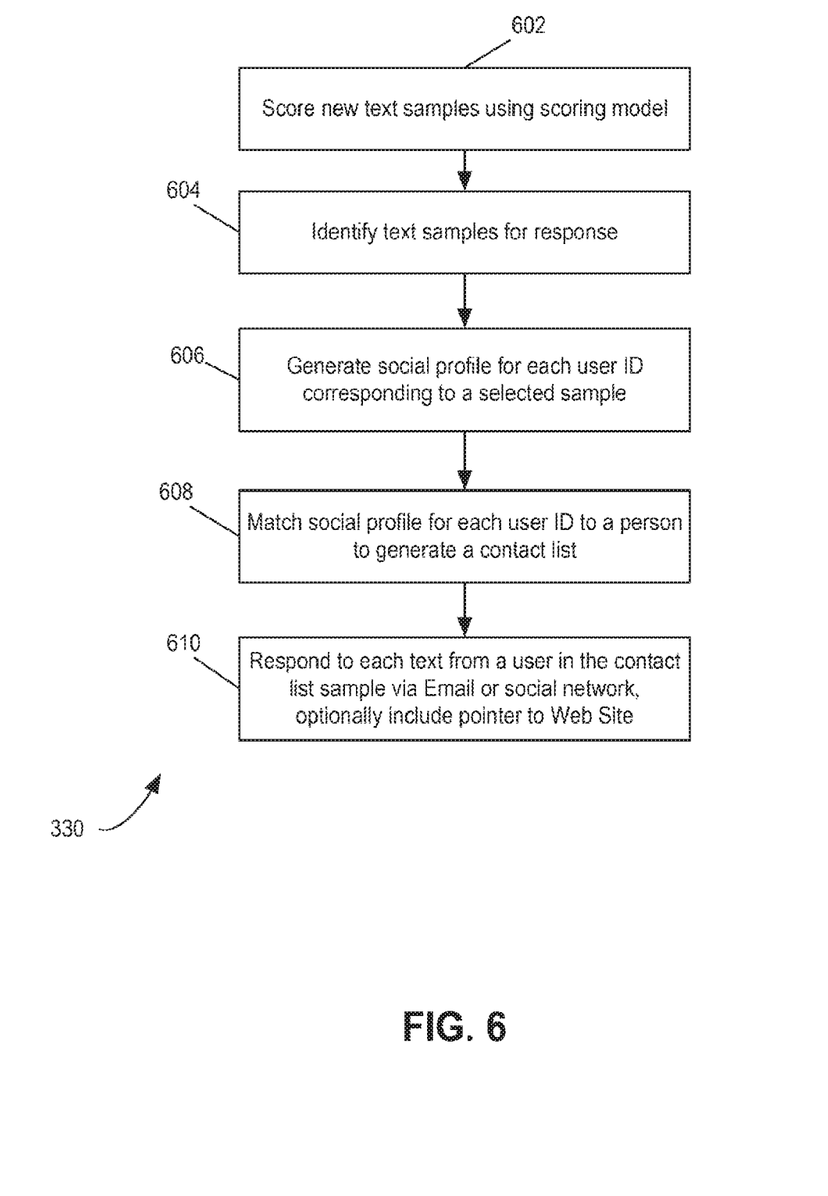
FIG. 6 depicts an example of a method for using a scoring model produced by training a text classifier as shown in FIG. 2 or 3 according to some aspects of the present disclosure.

The method of block 330 is illustrated in detail in FIG. 6, which depicts a flowchart for using a scoring model produced by training a text classifier. For purposes of this example, it can be assumed that the existing text samples used to train the classifier as well as new text samples to be classified originate through the Twitter social media platform, so that the text samples are tweets. But text samples from other social media platforms may be used.

At block 602, new text samples (e.g., new tweets) are scored using the scoring model 108. In some aspects, a reusable software component scores the new text samples using the scoring model. At block 604, each new tweet that merits an automated response is programmatically identified as a response tweet (response text sample). Typically, a score indicates a statistical likelihood of a tweet being representative of a specific class. A cutoff threshold is used, where tweets that score above the threshold are classified as being within the class of interest and tweets that score below the threshold are not classified as being within the class. Tweets that score equal to the threshold can be grouped either way as a system design choice. Each new tweet that falls into the class in this way merits an automated response and can be designated a response tweet (a response text sample). At block 606, a social profile is generated for each user ID corresponding to each selected tweet. At block 608, the social profile is used match each user ID for a response tweet to an identified individual, and these users are assembled into a contact list. At block 610, a response is directed to each person in the contact list.

The information contained in the metadata associated with the text sample and the content of the text sample can be used to create a social profile. In the context of Twitter, the metadata is the information supplied by the Twitter user when Twitter account was opened. For example, the display name, the Twitter handle, Email address, if provided as a part of a description or location are included in meta information. The meta information, along with the content of all the tweets generated by the Twitter user are mined to build a social profile. Specific elements of a social profile such as name, location(s), predicted gender are matched with either proprietary databases or publicly available databases (for example, property data) and used to link a social profile to a real person (or persons, if the information in social profiles is not specific enough to link decisively to one person). If the text originates from sources such as Emails or forums, the respective metadata can also be used in a similar fashion to generate a social profile and subsequently link to a real person.

A similar process can also be used to identify commercial entities undergoing an interesting event. For example, assume a company that specializes in providing event photography wants to identify businesses that are having events such as sales, grand openings, or appreciation events in order to reach out to potential customers that may be interested in event photography. Once the intent to have an event is identified using the text classifier, the social media or Email metadata associated with the potential customer that owns the social media or Email account can be mined and combined with information from a commercial database to identify the physical location and contact information of the potential customer. Similarly, the website details obtained from the social media or Email metadata can also be used to gather contact information by using a webcrawler and intelligent algorithms.

The response can take any of many forms by system design, or the form can be selected through operator input. The response can be generated and sent back to the user through the same channel from which the new text originated. Following the Twitter example above, a reply tweet can be generated and sent to the user through social network interface 102 for Twitter. The reply tweet can inform the user of a relevant event, for example, if the new tweet associated with the user was classified as indicative of a desire to purchase a car, the reply tweet could be, "The new Camry® on sale this weekend. Visit Toyota of Sandy Springs today." The reply tweet could also include contact information such as a telephone number or Email address. The reply tweet could include a link to third-party Web site, or a link to the Web site of the enterprise that is classifying text. In the latter case, information could be gathered and provided to a customer of the enterprise.

The Twitter example presented above is for illustrative purposes only. Text samples that are used for training and subsequently classified by system 100 can be from Emails, text messages, documents, messaging groups, or any other source. It should also be noted that the scoring model can be used to classify text into many different selected classes, wherein a class is representative of an intent on the part of a user. If text samples are to be sorted into multiple different classes, the blocks in FIG. 2, 3, or 6 are repeated for each class as appropriate. Responses can take a wide variety of forms. Since individuals are identified in the example above, the response can be made through a channel different than the one through which the response text sample was received. For example, a response to a tweet can be sent in an Email. If persons are not identified, a method like that shown in FIG. 6 can still be used but the response would need to be made through the channel from which the response text sample was received.

Computer System Examples

Figure 7:
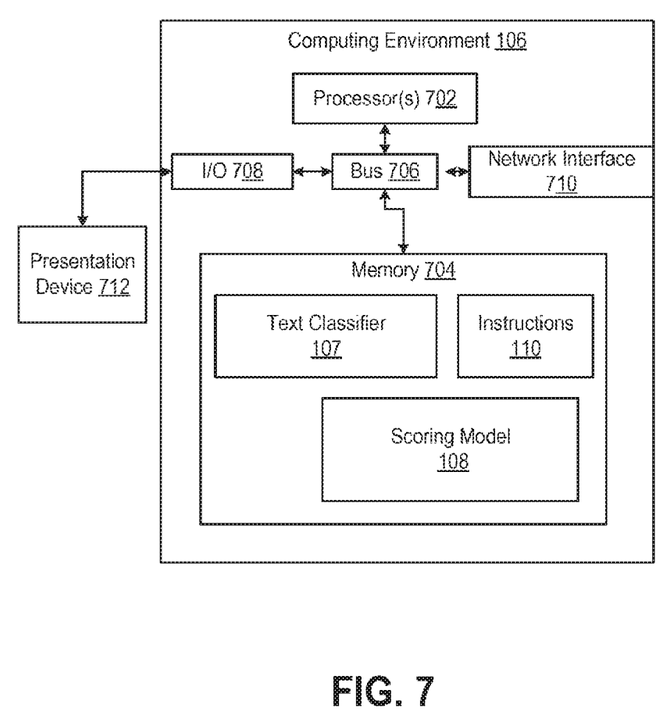
FIG. 7 depicts an example of a computing environment that can be used in classifying text samples using automatically generated seed data according to some aspects of the present disclosure.

Any suitable computing system or group of computing systems can be used to perform the attribute-creation operations described herein. For example, FIG. 7 is a block diagram depicting an example of a computing environment 106. The example of the computing environment 106 can include various devices for communicating with other devices in the computing system 100, as described with respect to FIG. 1. The computing environment 106 can include various devices for performing one or more of the operations described above with respect to FIGS. 1-3 and FIG. 6.

The computing environment 106 can include a processor 702 that is communicatively coupled to a memory 704. The processor 702 executes computer-executable program code stored in the memory 704, accesses information stored in the memory 704, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 702 include a microprocessor, an application-specific integrated circuit, a field-programmable gate array, or any other suitable processing device. The processor 702 can include any number of processing devices. The processor 702 can include or communicate with a memory 704. The memory 704 stores program code that, when executed by the processor 702, causes the processor to perform the operations described in this disclosure.

The memory 704 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language.

The computing environment 106 may also include a number of external or internal devices such as input or output devices. For example, the computing environment 106 is shown with an input/output interface 708 that can receive input from input devices or provide output to output devices, which, as an example, can be used by an operator to input a key or a cutoff di stance. A bus 706 can also be included in the computing environment 106. The bus 706 can communicatively couple one or more components of the computing environment 106.

The computing environment 106 can execute program code that includes one or more of the text classifier 107 or the scoring model 108. The program code for these modules may be resident in any suitable computer-readable medium and may be executed on any suitable processing device. For example, as depicted in FIG. 7, the program code for these modules can reside in the memory 704 at the computing environment 106. Executing these modules can configure the processor 702 to perform the operations described herein. Computing environment 106 as shown in FIG. 7 also includes program code instructions 110, which execute process 200 of FIG. 2 or process 300 of FIG. 3, making use of text classifier 107 and producing scoring model 108.

In some aspects, the computing environment 106 can include one or more output devices. One example of an output device is the network interface device 710 depicted in FIG. 7. A network interface device 710 can include any device or group of devices suitable for establishing a wired or wireless data connection to one or more data networks 104. Non-limiting examples of the network interface device 710 include an Ethernet network adapter, a modem, etc.

Another example of an output device is the presentation device 712 depicted in FIG. 7. A presentation device 712 can include any device or group of devices suitable for providing visual, auditory, or other suitable sensory output. Such output may be presented to an operator. Non-limiting examples of the presentation device 712 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," and "determining" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. Terms such as "above" and "below" when referring to numerical comparisons can encompass equality.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:
1. A system comprising:
a non-transitory computer-readable medium storing code for producing a scoring model; and
a processing device communicatively connected to the non-transitory computer-readable medium, wherein the processing device is configured for executing the code to perform operations comprising:

receiving a plurality of selections from existing text samples corresponding to a selected class, each selection of the plurality of selections having an embedding vector;

searching a pre-trained corpus to produce a plurality of nearest neighbor vectors for each embedding vector;

identifying nearest neighbor selections corresponding to at least some of the plurality of nearest neighbor vectors based on a distance between each nearest neighbor vector and the embedding vector for each selection;

producing a text cloud based on identified nearest neighbor selections wherein the text cloud includes an ordered list of at least a portion of the nearest neighbor selections;

producing seed data from additional text samples that are selected based on the text cloud;

training a text classifier using the seed data; and producing the scoring model using the text classifier, the scoring model operable to receive a plurality of new text samples and provide a score indicative of a likelihood of being a member of the selected class for each of the plurality of new text samples.

2. The system of claim 1 wherein the operations further comprise filtering the existing text samples to remove text samples associated with excluded entities.

3. The system of claim 1 wherein the operations further comprise:
scoring a new text sample from the plurality of new text samples using the scoring model;
determining a score for the new text sample based on a selected threshold; and
responding to the new text sample.

4. The system of claim 3 wherein the new text sample is received from a social networking platform, the selected class corresponds to an intent of a user, and responding to the new text sample comprises sending a response to the user.

5. The system of claim 1 wherein the operation of identifying nearest neighbor selections corresponding to the plurality of nearest neighbor vectors further comprises:
calculating the distance using a plurality of distance metrics; and
receiving operator input including a selected distance metric from the plurality of distance metrics.

6. The system of claim 5 wherein the plurality of distance metrics comprise Euclidian distance and cosine distance.

7. The system of claim 5 wherein the operator input further comprises a cutoff distance for the nearest neighbor vectors wherein the text cloud includes no nearest neighbor selections for which a distance between a corresponding nearest neighbor vector and the embedding vector for a selection is greater than the cutoff distance.

8. A method comprising:
receiving a plurality of selections from existing text samples corresponding to a selected class, each selection of the plurality of selections having an embedding vector;
searching, using a processing device, a pre-trained corpus to produce a plurality of nearest neighbor vectors for each embedding vector;
identifying, with the processing device, nearest neighbor words corresponding to the plurality of nearest neighbor vectors based on a distance between each nearest neighbor vector and the embedding vector for each selection;
producing, with the processing device, a text cloud from identified nearest neighbor words, wherein the text cloud includes an ordered list of at least a portion of the nearest neighbor words;
selecting, with the processing device, additional text samples based on the text cloud to produce seed data;
training, with the processing device, a text classifier using the seed data; and
producing, with the processing device, a scoring model based on the text classifier, the scoring model operable to receive a plurality of new text samples and provide a score indicative of a likelihood of being a member of the selected class for each of the plurality of new text samples.

9. The method of claim 8 further comprising filtering the existing text samples to remove text samples associated with excluded entities.

10. The method of claim 8 further comprising:
scoring a new text sample from the plurality of new text samples using the scoring model;
identifying the new text sample as a response text sample based on a selected threshold; and
responding to the new text sample.

11. The method of claim 10 wherein the new text sample is received from a social networking platform, the selected class corresponds to an intent of a user, and responding to the new text sample comprises sending a response to the user.

12. The method of claim 8, wherein the identifying of nearest neighbor words corresponding to the plurality of nearest neighbor vectors further comprises:
calculating the distance using a plurality of distance metrics; and
receiving operator input including a selected distance metric from the plurality of distance metrics.

13. The method of claim 12 wherein the plurality of distance metrics comprise Euclidian distance and cosine distance.

14. The method of claim 8, further comprising receiving operator input including a cutoff distance for nearest neighbor vectors wherein the text cloud includes no nearest neighbor words for which a distance between a corresponding nearest neighbor vector and the embedding vector for a selection is greater than the cutoff distance.

15. A non-transitory computer-readable medium having program code that is executable by a processing device to cause the processing device to perform operations, the operations comprising:
receiving a plurality of selections from existing text samples corresponding to a selected class, each selection of the plurality of selections having an embedding vector;
searching a pre-trained corpus to produce a plurality of nearest neighbor vectors for each embedding vector;
identifying nearest neighbor selections corresponding to at least some of the plurality of nearest neighbor vectors based on a distance between each nearest neighbor vector and the embedding vector for each selection to produce a text cloud, wherein the text cloud includes an ordered list of at least a portion of the nearest neighbor selections;
selecting additional text samples based on the text cloud to produce seed data;
training a text classifier using the seed data; and
producing a scoring model based on the text classifier, the scoring model operable to receive a plurality of new text samples and provide a score indicative of a likelihood of being a member of the selected class for each of the plurality of new text samples.

16. The non-transitory computer-readable medium of claim 15 wherein the operations further comprise repeating the operations for each of a plurality of selected classes.

17. The non-transitory computer-readable medium of claim 15 wherein the operations further comprise filtering the existing text samples to remove text samples associated with excluded entities.

18. The non-transitory computer-readable medium of claim 15 wherein the operations further comprise:
scoring a new text sample from the plurality of new text samples using the scoring model;
identifying the new text sample as a response text sample based on a selected threshold;
generating a social profile for a user ID associated with the new text sample;
matching the user ID to an identified individual using the social profile; and
responding to the new text sample.

19. The non-transitory computer-readable medium of claim 15, wherein the operation of identifying nearest neighbor selections corresponding to the plurality of nearest neighbor vectors further comprises:
calculating the distance using a plurality of distance metrics; and
receiving operator input including a selected distance metric from the plurality of distance metrics.

20. The non-transitory computer-readable medium of claim 15 wherein the operations further comprise receiving operator input including a cutoff distance for nearest neighbor vectors wherein the text cloud includes no nearest neighbor selections for which a distance between a corresponding nearest neighbor vector and the embedding vector for a selection is greater than the cutoff distance.

* * * * *